Apr. 24, 1923.
J. J. REINHOLD
1,452,759
FOOT LEVER
Filed May 20, 1922
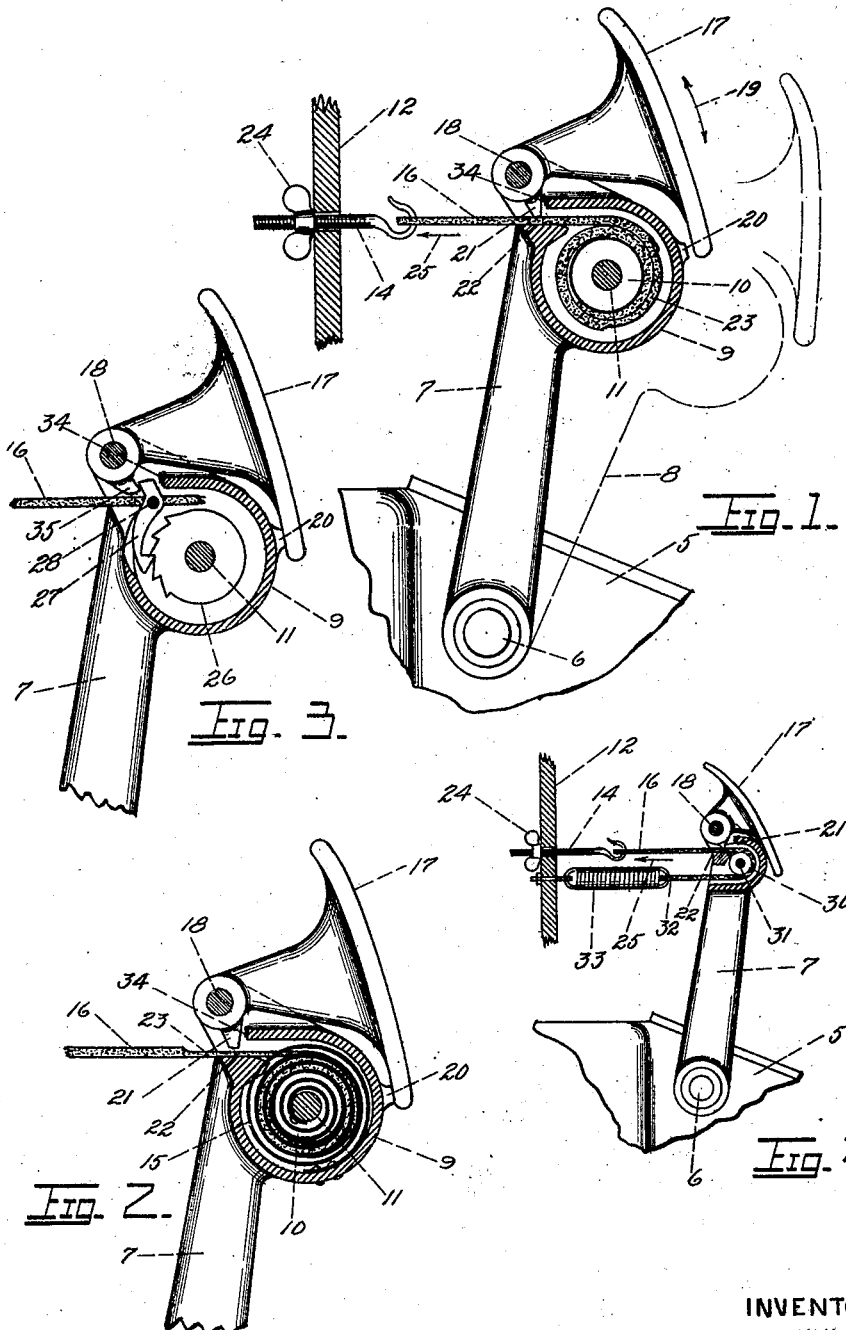
INVENTOR
JOHN J. REINHOLD
BY
ATTORNEY

Patented Apr. 24, 1923.

1,452,759

UNITED STATES PATENT OFFICE.

JOHN J. REINHOLD, OF MARIETTA, PENNSYLVANIA.

FOOT LEVER.

Application filed May 20, 1922. Serial No. 562,507.

*To all whom it may concern:*

Be it known that I, JOHN J. REINHOLD, a citizen of the United States, and a resident of Marietta, county of Lancaster, State of Pennsylvania, have invented certain new and useful Improvements in Foot Levers, of which the following is a specification.

This invention relates to foot levers for speed changing transmission devices such as for instance as are employed on Ford automobiles.

The object of this invention is to provide a new and simple device for locking the transmission foot lever of Ford automobiles in neutral and low gear positions.

Other objects will be apparent from the following description taken in connection with the accompanying drawing, forming a part hereof, and in which similar numerals refer to similar parts throughout the several views.

Figs. 1 and 2 represent a foot lever embodying the main features of my invention.

Figs. 3 and 4 represent modifications of my invention.

Referring to Figs 1 and 2 in the drawing, 5 represents the transmission case of a Ford engine. 6 is the clutch pedal shaft and is adapted to operate the transmission mechanism in the regular manner. A lever 7 is fixed to the clutch pedal shaft 6 in the regular manner. It is common knowledge that in the Ford construction there is a spring adapted to normally hold the clutch pedal shaft 6 in high gear position, under which condition the lever 7 takes the position as shown at 8 in light broken lines. The lever 7 as shown in full lines represents the position when the transmission is in low gear. The neutral position of course would be approximately mid-way between the two last-named positions.

The usual practice when driving a Ford automobile is to hold the lever 7 in neutral and low gear position with the foot which is tiresome and inconvenient, therefore my object is to eliminate such inconvenience.

The end of the lever 7 is provided with a casing 9 in which is journaled a drum 10 through the shaft 11. Around the drum 10 is wound a flexible belt 16, preferably of leather, the end of which is fastened to some convenient part of the automobile body back of the lever as indicated at 12, and preferably through an adjustable hook 14.

The drum 10 is provided with a spiral spring 15 which is adapted to normally wind the flexible belt 16 upon the drum.

A foot pedal 17 is pivoted on the pin 18 and adapted to swing in the directions indicated by the arrow 19. The stopping lug 20 limits the movement in the downward direction, and the edge 34 of the casing 9 in the upward direction, through the lug 21.

A flat surface 22 is provided, over which the belt 16 slides, and the lug 21 is adapted to grip the belt against the surface 22 when the foot pedal is down. It is obvious of course that this gripping action must occur before the foot pedal bears against the stopping lug 20.

The operation of this device is as follows: When the lever 7 is moved from high gear position to neutral or low gear positions, the foot pedal 17 must be raised to the extreme upper position; then the spiral spring 15 will cause the drum 10 to rotate during the forward movement of the lever 7 and wind up the belt 16, constantly taking up all slack in the belt. When the lever 7 is in the position desired (neutral or low gear) the foot pedal 17 is allowed to fall down, when the lug 21 will firmly grip the belt 16 against the surface 22; it is obvious that the lever 7 cannot return to high gear position for the reason that the gripping action of the lug 21 is increased by the tension set up in the belt 16, and the lever 7 thereby remains in the position desired.

It is obvious that by raising the foot pedal 17 the gripping action on the belt 16 is released, and the lever 7 can be moved from low gear position to neutral, or directly into high gear position.

On account of the particular construction of the Ford transmission it is desirable to avoid any possibility of the lever 7 being locked at a point close to high gear position, as it might prevent the normal action of the spring for holding the transmission mechanism in high gear condition. To avoid such an occurrence I reduce the thickness of the belt 16 as shown at 23 so that the lug 21 cannot grip the belt at this point.

After a certain period of time it is obvious that the belt 16 will become worn where it is gripped by the lug 21 at low gear and neutral position, while at other points this belt may be in good condition. To take advantage of the good points in the belt 16, the nut 24 may be screwed up, drawing the belt 16 back in the direction indicated by the arrow 25 until the lug 21 grips the same at a new point when the lever 7 is set in the low gear and neutral position.

Referring to Fig. 3, which is a modification of the construction shown in Figs. 1 and 2: I here avoid gripping action on the belt 16 by fixing to the shaft 11 a ratchet wheel 26, and provide a pawl 27 pivoted on the pin 28 which is adapted to engage with the teeth of the ratchet wheel. By raising or lowering the foot pedal 17 as described with reference to Figs. 1 and 2, the lug 35 will actuate the pawl 27 and thereby lock or unlock rotation of the drum 10. Teeth are provided on the ratchet wheel 26 only throughout the circumference necessary to lock the lever 7 in neutral and low gear positions, thereby no locking of the drum 10 can take place when the lever is near the high gear position.

It of course is obvious that the drum 10 and spiral spring 15 are essential with the modified construction, and the construction thereof may be identical to that shown in Figs. 1 and 2.

Referring to Fig. 4, which represents another modification of the device, in which the spiral spring 15 and the drum 10 are eliminated. Here the drum is replaced by a roller 30 which is free to turn on the pin 31. The end 32 of the belt 16 is connected to a contractile spring 33 which in turn is connected to the automobile body 12 and adapted to keep the belt 16 taut at all times. All other details and operations of this construction are substantially the same as shown in Figs. 1 and 2, and as heretofore described.

Having thus described my invention what I claim, and desire to secure by United States Letters Patent is as follows:

In a device of the class described, the combination of a foot lever, a foot pedal pivoted on the end thereof, a flexible belt the one end being fixed to a stationary element, means for maintaining said belt taut, and means adapted to lock said foot lever to said belt through the manipulation of said foot pedal.

In testimony whereof I affix my signature.

JOHN J. REINHOLD.